United States Patent [19]

Henderson et al.

[11] Patent Number: 5,530,489
[45] Date of Patent: Jun. 25, 1996

[54] SINGLE PROJECTION LENS COLOR PROJECTION SYSTEM

[76] Inventors: Alan R. Henderson, 2305 Highland Dr., Carlsbad, Calif. 92008; Christopher S. Sexton, 15277 Maturin Dr., #56, San Diego, Calif. 92127

[21] Appl. No.: 318,532

[22] Filed: Oct. 5, 1994

Related U.S. Application Data

[63] Continuation of Ser. No. 40,755, Mar. 31, 1993, abandoned.

[51] Int. Cl.$^6$ ........................................ H04N 9/31
[52] U.S. Cl. ........................... 348/757; 348/756; 359/40
[58] Field of Search ........................... 348/744, 750, 348/751, 752, 756–762, 766, 777, 784; 359/40, 41, 42, 71, 72, 93, 66, 48, 70, 637–639, 629; H04N 9/31, 9/30, 5/74

[56] References Cited

U.S. PATENT DOCUMENTS

| | | | |
|---|---|---|---|
| 2,792,740 | 5/1957 | Haynes | 88/1 |
| 2,909,097 | 10/1959 | Alden et al. | 88/24 |
| 2,962,545 | 11/1960 | Dillenburger | 178/5.4 |
| 4,191,456 | 3/1980 | Hong et al. | 348/751 |
| 4,228,458 | 10/1980 | Yamauchi et al. | 358/55 |
| 4,586,076 | 4/1986 | Watt | 358/75 |
| 4,687,301 | 8/1987 | Ledebuhr | 358/61 |
| 4,805,028 | 2/1989 | Nishioka et al. | 358/225 |
| 4,836,649 | 6/1989 | Ledebuhr et al. | 350/331 R |
| 4,911,547 | 5/1990 | Ledebuhr | 353/31 |
| 4,933,751 | 6/1990 | Shinonaga et al. | 358/55 |
| 5,130,826 | 7/1992 | Takanashi et al. | 358/61 |
| 5,153,752 | 10/1992 | Kurematsu et al. | 358/61 |
| 5,170,250 | 12/1992 | Ledebuhr | 358/60 |
| 5,172,221 | 12/1992 | Ko | 358/61 |
| 5,237,435 | 8/1993 | Kurematsu et al. | 348/751 |

FOREIGN PATENT DOCUMENTS

| | | |
|---|---|---|
| 1259376 | 1/1968 | Germany . |
| 40-13310 | 5/1962 | Japan . |
| 59-134994 | 8/1984 | Japan . |
| 59-196682 | 11/1984 | Japan . |

OTHER PUBLICATIONS

Sakai, H., et al.; "An Integrated Pickup Component Module for a High Performance Economical TV Camera;" SMPTE Journal, Jun. 1979, vol. 88, No. 6, pp. 426–428.
AD 358–55, Advertisement for Bell & Howell color camera.

*Primary Examiner*—Safet Metjahic
*Assistant Examiner*—Michael H. Lee

[57] ABSTRACT

Color separation dichroic mirrors (40,42) positioned between a group of reflective liquid crystal light valves (26,28,30) and a polarization analyzer (14) enable a single projection lens (18) to project all colors via a light beam of single linear polarization with a high degree of contrast, efficiency and color separation. The polarization analyzer (14) directs a light beam with a single polarization state to a pair of dichroic color filters (40,42) which separate the beam into three different colors that are sent to three different reflective liquid crystal light valves (26,28,30). The light valves reflect the respective colored light beams with change of polarization state back to the dichroic mirrors (40,42) which combine the three colors into a single combined multi-color beam that is fed through the polarization analyzer (14) to a single system projection lens (18).

26 Claims, 2 Drawing Sheets

SINGLE PROJECTION LENS COLOR PROJECTION SYSTEM

This is a continuation of U.S. patent application Ser. No. 08/040,755, filed Mar. 31, 1993, now abandoned..

BACKGROUND OF THE INVENTION

1. Field of the Invention

The present invention relates to optical projection and more particularly concerns an improved liquid crystal light valve color projection system.

2. Description of Related Art

Liquid crystal light valve (LCLV) projection systems find utility in many applications, such as those where a very large projection screen must be illuminated by a projector occupying a very small volume, and also in very high brightness projection display systems. Where intensity of light emitted by a conventional display screen, such as a cathode ray tube, is not adequate because of high ambient light conditions, or where very large projection screens are employed in limited space, use of a liquid crystal color display projection system may be advantageous. Some prior color projection systems embody production of three high intensity substantially monochromatic light beams of different color that are fed to or through three separate liquid crystal modulators. Where transmission type (active-matrix) liquid crystal light valves are employed, each liquid crystal light valve individually modulates its respective monochromatic beam over a spatial array of pixels, and the beams are then combined within a multiplexer or combining prism and projected as a single combined beam of appropriate color. The combined beam bears information imposed thereon by computer controlled modulation of the several liquid crystal light valves. The combined beam is fed through a projection lens onto the back surface, in some cases, of a diffuse display screen to provide appropriate display on the screen front surface.

Active-matrix liquid crystal projectors have been made by Victor Corporation of Japan (JVC), Seiko Epson Company, Lt., Sharp, Sanyo and Toshiba, among others, and have been provided as a substitute for conventional cathode ray tube display systems. To achieve a high definition full resolution color picture on screen, the Victor Corporation and Seiko Epson Company liquid crystal projector, identified as Model L-1000, employs a 250 watt halogen lamp, three transmissive liquid crystal display panels and a complex system of lenses and dichroic mirrors. The dichroic mirrors separate white light emitted by the high intensity halogen lamp into three monochromatic beams, red, blue and green. These are passed through the individual liquid crystal modulator panels, and the resulting modulated monochromatic light beams are combined into a single multi-color beam by an X-prism, and then projected through a set of lenses onto the screen. Such systems necessarily employ large numbers of optical relay systems or optical elements, such as lenses and mirrors, to split and distribute reading light from the source lamp to the various liquid crystal modules. Further, these relay systems require significant amounts of space to position the several dichroic reflecting mirrors, which in and of themselves require optical relay systems to provide longer focal lengths that enable proper positioning of such additional components. Physical size of the system is therefore greatly increased.

Similar problems, e.g. large numbers of components and increased space requirements, exist in those projection systems employing reflective liquid crystal light valves. In some reflective liquid crystal light valve systems reading light from a high powered source is polarized by a polarizing beam splitting prism designed to reflect "S" polarized light (where the polarization axis, namely the E field vector, is parallel to the plane of incidence) and to transmit "P" polarized light (where the polarization axis, the E field vector, is perpendicular to the plane of incidence). The "S" polarization component of the reading light is reflected to the light valve, which, when activated by an image from a writing light source such as a cathode ray tube, reflects the polarized light and rotates its polarization 90° so that it becomes "P" polarized light. The "P" polarization component is transmitted through the prism to the projection lens. When such reflective liquid crystal light valves are employed in a color projection system, the input light path must be lengthened by additional relay optics to provide for separation of the reading light source into three color components and pre-polarization of the several color components.

Other prior art systems include projector configurations having three projection lenses, projectors having multiple color tuned polarization analyzers or color trim filters, and dichroics requiring oil emersion. Some systems require light of both linear polarizations. The prior art tends to be more costly and bulky, owing to the larger number of components. Oil emersion of dichroics, if required, degrades efficient reflection of P state polarization. Use of systems employing three projection lenses requires precision convergence at the screen, and therefore requires readjustment for reconvergence whenever the projector or screen is moved. Further, in such three projector systems, trapezoid correction is different for each color when the projector is tilted with respect to the screen.

Accordingly, it is an object of the present invention to provide a color projection system which avoids or minimizes the above mentioned problems.

SUMMARY OF THE INVENTION

In carrying out principles of the present invention in accordance with a preferred embodiment thereof, first, second and third reflective liquid crystal light valves are positioned on and to at least one side of the projection axis of a single projection lens. A polarization analyzer positioned on the projection lens axis between the lens and the light valves transmits light of only a single polarization state to a set of dichroic mirrors configured and arranged for separating light from the polarization analyzer into light of separate colors and directing the different colors to respective ones of the three liquid crystal light valves. Light of individual colors reflected from the respective liquid crystal light valves is combined by the dichroic mirrors into a combined beam directed back through the polarization analyzer for transmission to and projection by the projection lens.

The arrangement enables use of dichroic mirrors which have sharp spectral transition from reflective to transmissive modes, having controlled separation between transition wavelengths for S and P state polarizations, and having high efficiency in both reflective and transmissive modes. These characteristics provide superior efficiency, color separation and controllable spectrum notches between the primary colors without use of separate trim filters. The use of a single projection lens avoids convergence problems and provides ease of focus and projector use in applications that require a small output aperture and lower cost.

DESCRIPTION OF THE PREFERRED EMBODIMENT

Figure 1:
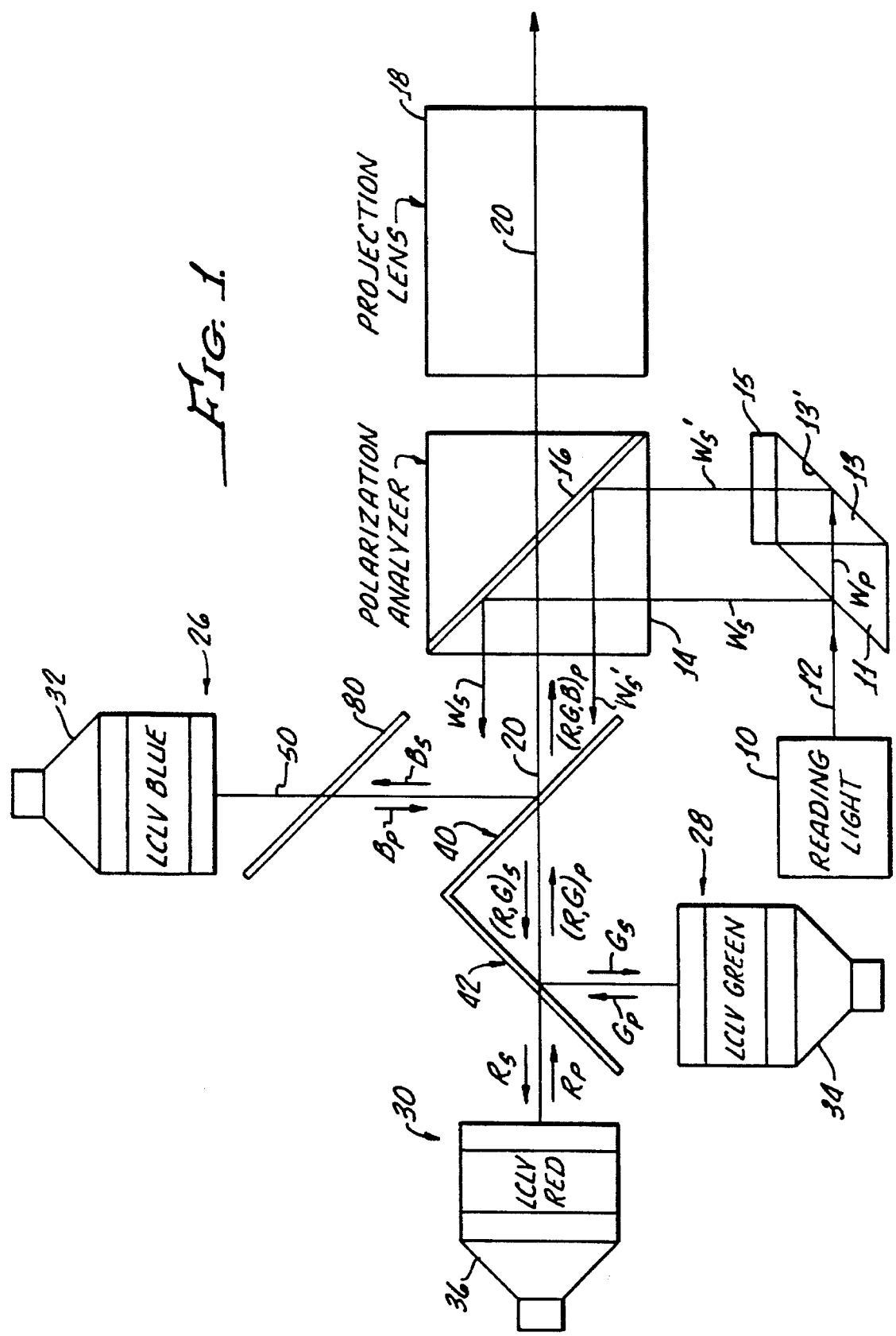
FIG. 1 illustrates components of a color projection system embodying principles of the present invention.

FIG. 1 illustrates basic components and configuration of parts of a color liquid crystal light valve system embodying principles of the present invention. A source of very high intensity reading light 10 may include a xenon arc lamp, various relay mirrors and pre-polarization filters (not shown). The source 10 provides on an input path 12 a high intensity reading beam having a full spectral content from approximately 450 nanometers to 650 nanometers to cover blue, green and red. Reading light from source 10 is unpolarized and directed toward a polarizing beam splitting prism 11 that reflects light of S polarization, $W_s$, and passes light of P polarization $W_p$ to a reflecting prism 13. The P polarized light undergoes total internal reflection at the glass-air interface 13' of prism 13 and is directed to and through a half wavelength retarder plate 15 which rotates polarization of the P polarized light to provide a recovered beam of S polarized light, $W_s'$ in a beam parallel to the first reflected beam $W_s$. The two parallel beams of S polarized light smoothly merge into a single quasi-rectangular beam that is fed to a substantially conventional polarization analyzer 14. The conventional polarization analyzer, which may be a form of a MacNeille prism, includes a reflective transmissive dichroic mirror 16 immersed in a liquid. The dichroic mirror 16 is coated so as to reflect all wavelengths of light having an S state polarization, for example, and to transmit all wavelengths of light having a P state polarization. Thus, even if incoming reading light transmitted to analyzer 14 should include light of both S and P polarization states, the use of the polarization analyzer 14 would ensure that only light of polarization state S is reflected. The described arrangement is more efficient than previous designs in that P polarization light has been converted to S polarization before reading polarization analyzer 14.

Mounted adjacent polarization analyzer 14 is a single output projection lens 18, having an output projection axis 20 which extends at an angle, such as 45°, to the plane of the polarization analyzer mirror 16. Full color light of polarization state S, as indicated in the drawing by the symbols $W_s$ and $W_s'$, is reflected by the polarization analyzer rearwardly along the projection axis 20 toward three reflective liquid crystal light valves 26,28,30 that are individually associated with different colors. Each of the light valves is coupled with a respective one of three separate sources of input or writing light, such as cathode ray tubes 32,34,36. The "red" LCLV 30 is positioned on the axis 20 and the "blue" and "green" LCLV's 26 and 28 are positioned on opposite sides of the axis. Interposed between the polarization analyzer and the three liquid crystal light valves is a pair of dichroic mirrors (dichroic filters) 40 and 42, each of which is configured and arranged, as by provision of particular reflective coatings in a well known manner, to selectively reflect and transmit light of different colors. The dichroic mirrors act in substantially the same manner on such light regardless of whether it is of S or P polarization state. Thus, dichroic mirror 40 is coated so as to reflect blue light, having a wavelength in the order of about 440 to 500 nanometers, and to transmit all light, green and red, having lower wavelengths. Thus, dichroic mirror 40 reflects blue light of polarization state S, as indicated by the symbol $B_s$, along light path 50 to the blue liquid crystal light valve 26. The latter is termed "blue" solely because of its input, which is provided by light from its cathode ray tube 32 in a form that represents the blue component of a multi-colored image that is to be projected.

Dichroic mirror 40 transmits light above about 500 nanometers, which includes red and green light, as indicated by the symbol (R,G), to the second dichroic mirror 42. Both mirrors 40 and 42 are positioned at a substantial angle, such as 45°, with respect to the projection axis 20, with mirror 40 being oriented so as to reflect light toward one side of the projection axis and mirror 42 being oriented at 90° to the orientation of mirror 40 for reflection of light to the opposite side of the projection axis. It will be readily understood that the two dichroic mirrors alternatively may be parallel to one another so that both will reflect to the same side of the projection axis (in which case both LCLV's 26,28 are on such side of the axis). With the relative orientations illustrated in FIG. 1, light reflected from dichroic mirror 42, which in this case is green light, having a wavelength in the range of about 500 to 590 nanometers, is reflected to the "green" liquid crystal light valve 28, as indicated by the symbol $G_s$. This liquid crystal light valve has an input from its cathode ray tube 34, which is the green component of the image to be projected. Light impinging on all LCLV's, regardless of color, is of S polarization state.

The dichroic mirror 42 reflects the green light but transmits light of all lower wavelengths, which in this case is the red light, as indicated by the symbol $R_s$. Thus the red light is transmitted through both of the dichroic mirrors along the projection axis to impinge upon the red liquid crystal light valve 30, which has its active face positioned perpendicular to the projection axis. As illustrated in the drawings, the other liquid crystal light valves have their active faces positioned on opposite sides of the projection axis and parallel thereto. Liquid crystal light valve 30 is optically addressed by its cathode ray tube 36 with an optical signal representing the red color component of the image to be projected.

Those areas of each of the liquid crystal light valves that are activated by bright areas of an image from its cathode ray tube writing source (e.g. "light" areas of the LCLV), reflect the S polarized light and concomitantly rotate its polarization 90° so that the reflected light is light of P polarization. Thus reflected light of P polarization is provided from each liquid crystal light valve in a spatial pattern corresponding to the spatial pattern of the excitation provided by the input writing light.

For those areas of the liquid crystal light valve that are not excited by input writing light ("dark" areas), the reading or illumination light (of S polarization) is reflected without change of polarization. Reflected S polarization state light is transmitted and reflected back through the dichroic mirrors 40,42 to the polarization analyzer 14. The latter selectively reflects light of S state polarization back toward the illumination light source, where it is effectively discarded.

Red light of P polarization is reflected from light areas of LCLV 30 and transmitted through dichroic mirror 42 for combination with green light of P polarization that is reflected from light areas of the green liquid crystal light valve 28 and also reflected from the dichroic mirror 42. Accordingly, the latter combines the red and green light reflected from the liquid crystal light valves and having a polarization state P. This combined red, green light $(R,G)_p$ is transmitted through the first dichroic filter 40, which receives and reflects P state polarization light reflected from light areas of liquid crystal light valve 26 to provide a combined red, green and blue light of polarization state P, $(R,G,B)_p$, that is transmitted back to the polarization analyzer 14. The latter, as previously mentioned, will transmit light of polarization state P, and thus the combined multicolor beam, modulated by the three cathode ray tube inputs, is transmitted from the polarization analyzer to the projection lens 18 for projection to a screen (not shown).

It will be seen that blue light is reflected from dichroic mirror 40 but is not transmitted through either mirror. Green light is transmitted through dichroic mirror 40 two times, once in its passage from the polarization analyzer to the green reflecting mirror 42, and then after its reflection back from the green liquid crystal light valve for a second transmission through the dichroic mirror 40. Red light, on the other hand, passes through the dichroic mirrors a total of four times, once through each of the mirrors in its transmission from the polarization analyzer to the liquid crystal light valve 30 and a second time through both mirrors in its reflection from the liquid crystal light valve back to the polarization analyzer. The difference in the number of transmissions of the three colors, red being transmitted through four thicknesses of dichroic mirrors, green being transmitted through two thicknesses, and blue not being transmitted at all, may give rise to a degree of astigmatism. Substantially all of such astigmatism may be eliminated by causing the blue beam to be transmitted twice through a plate having a thickness equal to the thickness of each of the two dichroic mirrors 40,42, which are of the same thickness. To this end a transparent plate 80, having minimized reflectivity, is positioned parallel to dichroic mirror 40 between the dichroic mirror and the "blue" liquid crystal light valve. Accordingly, the blue light will pass through the plate 80 twice in its passage to and from the reflective liquid crystal light valve 26. Thus, red light is now transmitted through four thicknesses, green light through two and blue also through two. It has been found that this change alone (addition of plate 80) is sufficient to eliminate a substantial portion of the astigmatism that is observable in the absence of plate 80.

Figure 2:
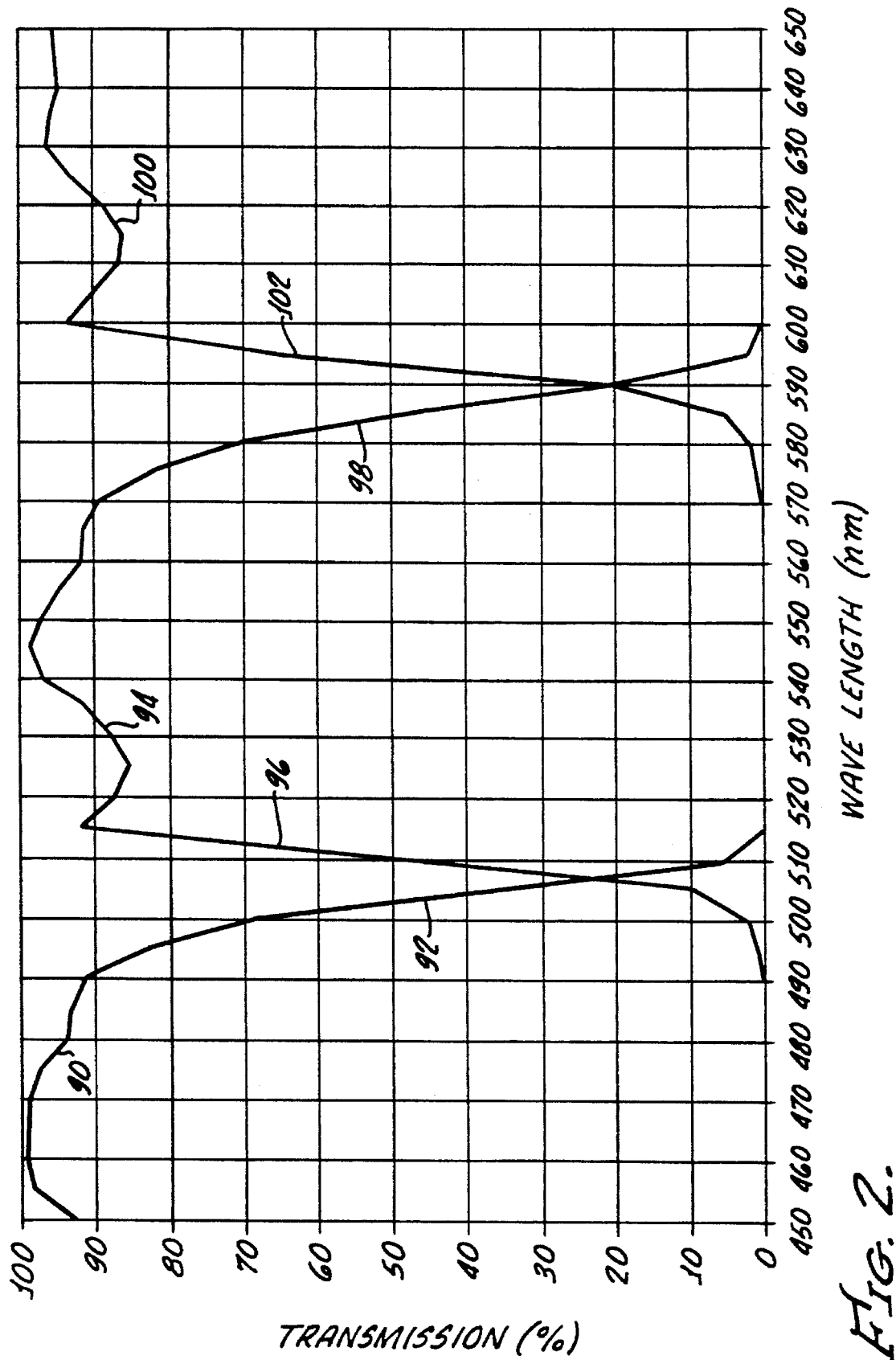
FIG. 2 shows spectral characteristics of transmission of the set of dichroic mirrors of FIG. 1.

As previously mentioned, the liquid crystal light valves 26 and 28 may be located either on opposite sides or the same side of the projection axis. Further, the dichroic mirror design may be optimized for a particular angle of illumination light incidence by selection of coatings and the configuration of the mirrors and light valves such as to allow the dichroic mirrors to be either high pass, low pass or band pass, or some combination of such filter characteristics. Thus, for example, as illustrated in FIG. 2, transmission characteristics for the system, namely the combined light that is transmitted to and projected by the lens, exhibit spectral content of the projected beam of the nature shown in FIG. 2. In this figure transmission is shown as a percentage of light in the output projection beam with respect to the total incoming light that is incident upon the polarization analyzer. Thus, blue light transmission, as indicated by curve 90, has a fairly steep cutoff, as indicated at 92, at wavelengths in the order of about 500 nanometers. Green light, indicated by curve 94, has steep cutoffs, as indicated by slopes 96 and 95. The green spectrum is provided from the transmission characteristics of dichroic filter 40 and reflection characteristics of filter 42. Similarly, the long pass filter characteristics of the dichroic mirrors 40 and 42 provide for transmission of red, as indicated by curve 100, having a fairly steep cutoff 102.

It will be noted that the cutoff slopes 92,96,98 and 102 for each color is significantly steepened because of the fact that there is a double passage of light through the filter system. This includes the double passage of red light, the double passage, including reflection and transmission of green light, and the double reflection of the blue light. Moreover, as illustrated in FIG. 2, the crossover from one color to another is at a point somewhat less than 25% of the maximum intensity level. This is a characteristic of the described system that provides good color separation and saturation. The high percentages of transmission illustrate the very high utilization efficiency of the system. As previously mentioned, the dichroic filters preferably have substantially the same cutoff wavelengths for both S and P state polarizations. However, if it is desired to widen the separation between colors, as for example to provide a greater attenuation of yellow between the green and red, the green reflecting filter 42 of FIG. 1 can be readily modified according to well known coating techniques to provide its cutoff for S state polarization at a longer wavelength than its cutoff for P state polarization. With such a modification operation of the earlier described filter system would be as follows: green and yellow S state polarization light is reflected by dichroic filter 42 to light valve 28. At areas where the light valve 28 is activated, the S polarization state is rotated to P state, and reflected to dichroic mirror 42. Yellow P state polarized light at a longer wavelength than the green is beyond the P state reflective cutoff of modified dichroic filter 42, and therefore it is transmitted through this filter to be eliminated from the system. Green light is reflected from the light areas of the green light valve 28 and is reflected from mirror 42 as before. The modification just described, it will be understood, is merely an example of variations that may be made in the system to enhance its operation according to particular requirements of an individual application.

Preferably the dichroic mirrors 40 and 42 are mounted in air to eliminate problems that might otherwise be encountered in efficient reflection of P state polarization light from a mirror immersed in a liquid.

It will be seen that there has been described an improved full color projection system enabling use of a single projection lens to project all colors of a single linear polarization with a high degree of contrast, efficiency and color separation.

What is claimed is:

1. A liquid crystal light valve color projection system comprising:

a projection lens having a projection axis, first, second and third reflective liquid crystal light valves of which one is positioned on said projection axis and the others are positioned on at least one side of said projection axis, a polarization analyzer positioned on said projection axis between said projection lens and said liquid crystal light valves, said polarization analyzer including means for transmitting light of a first polarization state and reflecting light of a second polarization state, dichroic mirror means, including a plurality of dichroic mirrors immersed in air, said dichroic mirror means positioned on said axis between said polarization analyzer and said liquid crystal light valves for separating light from said polarization analyzer into light of separate colors and directing said light of separate colors from said polarization analyzer to respective ones of said liquid crystal light valves, said dichroic mirror means for combining light reflected from said liquid crystal light valves into a combined beam and directing said combined beam back to said polarization analyzer for transmission to said projection lens, said dichroic mirror means introducing differing path lengths for said light of separate colors, compensation means for at least partially equalizing said differing path lengths for said light of separate colors, whereby astigmatism is reduced, first polarizing means disposed offset from said projection axis for directing a beam of reading light to said polarization analyzer, and means for directing writing light to said liquid crystal light valves.

2. The projection system of claim 1 wherein said beam of reading light directed to said polarization analyzer has a single polarization state.

3. The projection system of claim 1 wherein said polarization analyzer prevents reading light of one of said polarization states from being reflected to said dichroic mirror means.

4. The projection system of claim 1 wherein said light of different colors directed to said liquid crystal light valves all has the same one of said first and second polarization states, and wherein said combined beam transmitted to said projection lens has the other one of said polarization states.

5. The projection system of claim 1 wherein said dichroic mirror means comprises a plurality of dichroic mirrors each configured and arranged to transmit and reflect light from the polarization analyzer and to transmit and reflect light reflected from said liquid crystal light valves.

6. The projection system of claim 1 wherein said dichroic mirror means comprises a plurality of dichroic mirrors each configured and arranged to transmit and reflect light from the polarization analyzer of a first polarization state and transmit and reflect light from said liquid crystal light valves of a second polarization state.

7. The projection system of claim 1 wherein one of said liquid crystal light valves has a reflective face that is perpendicular to said projection axis and said other liquid crystal light valves have reflective faces parallel to said projection axis.

8. The projection system of claim 1 wherein said dichroic mirror means comprises first and second dichroic mirrors positioned on said projection axis and oriented at an angle thereto.

9. The projection system of claim 1 wherein said dichroic mirror means comprises first dichroic mirror means for transmitting red and green light and reflecting blue light, and second dichroic mirror means positioned between said first dichroic mirror means and two of said liquid crystal light valves for reflecting green light and transmitting red light.

10. The projection system of claim 9 wherein said first dichroic mirror means is configured and arranged to reflect blue light of one polarization state from the polarization analyzer to said first liquid crystal light valve, and to reflect blue light of a different polarization state from said first liquid crystal light valve to said polarization analyzer.

11. The projection system of claim 9 wherein said second dichroic mirror means is configured and arranged to reflect green light of one polarization state from said polarization analyzer to said second liquid crystal light valve and to reflect green light of another polarization state from said second liquid crystal light valve to said polarization analyzer.

12. The projection system of claim 9 wherein said second dichroic mirror means is configured and arranged to transmit red light of one polarization state from said polarization analyzer to said third liquid crystal light valve and to transmit red light of another polarization state from said third liquid crystal light valve to said polarization analyzer.

13. The projection system of claim 9 wherein said compensation means includes a transparent plate positioned between said first dichroic mirror means and said first liquid crystal light valve, said plate having a thickness substantially equal to the thickness of said first dichroic mirror means.

14. The projection system of claim 1 wherein all of said light of different colors that is directed from said polarization analyzer to said liquid crystal light valves has the same polarization state.

15. The projection system of claim 1 wherein said dichroic mirror means includes first and second mirrors, each including means for reflecting or transmitting light of either said first or second polarization state.

16. The projection system of claim 1 wherein said means for directing writing light comprises means for optically addressing individual ones of said liquid crystal light valves with images of respectively different colors.

17. A method for projecting a color image comprising the steps of:

providing a single projection lens having a projection axis, positioning one of said reflective liquid crystal light valve on said projection axis, positioning second and third ones of said reflective liquid crystal light valves on at least one side of said projection axis, using a polarizing beam splitter positioned on one side of said projection axis to direct plural light beams each having a first polarization state along said projection axis toward said liquid crystal light valves, separating said light beam into light of different colors using a plurality of dichroic mirrors immersed in air and directing said light of different colors to respective ones of said reflective liquid crystal light valves said wherein step of separating introduces differing path lengths for said light of different colors, compensating for said differing path lengths by at least partially equalizing said differing path lengths for said light of different colors, whereby astigmatism is reduced, providing an input to each of said liquid crystal light valves to cause said liquid crystal light valves to reflect light with a second polarization state having spatial patterns representing said liquid crystal light valve inputs, combining light reflected from said liquid crystal light valves into a combined multi-colored beam, and directing said combined beam back to said projection lens for transmission.

18. The method of claim 17 wherein said step of directing a light beam having a first polarization state includes preventing reflection toward said liquid crystal light valves of light having a polarization state different than said first polarization state.

19. The method of claim 17 wherein said step of separating light into light of separate colors comprises reflecting blue light to said first liquid crystal light valve and transmitting red and green light, reflecting green light to said second liquid crystal light valve, and transmitting red light to said third liquid crystal light valve.

20. The method of claim 19 wherein said step of combining light reflected from said liquid crystal light valves comprises combining red light reflected from said third liquid crystal light valve with green light reflected from said second liquid crystal light valve to form a red/green beam, and combining said red/green beam with blue light reflected from said first liquid crystal light valve.

21. The method of claim 20 including the step of narrowing the reflection spectrum for light of said second polarization state reflected from said liquid crystal light valves to thereby decrease undesired light of selected spectral content.

22. The method of claim 20 wherein said step of combining light reflected from said liquid crystal light valves comprises reflecting light from a dichroic filter, and including the step of narrowing the reflection spectrum of said dichroic filter to eliminate reflection of light of a selected spectral content.

23. The method of claim 17 wherein said step of compensating includes the step of increasing the length of the optical path of light of one of said colors to decrease astigmatism.

24. The liquid crystal light valve color projection system of claim 1 wherein said dichroic mirror means includes a plurality of dichroic mirrors, wherein said light of separate colors is transmitted through said dichroic mirrors an unequal number of times, and wherein said compensation means comprises at least one transparent plate through which at least one of said light of separate colors passes.

25. In a liquid crystal light valve (LCLV) color projection system including a projection lens having a projection axis, first, second and third reflective liquid crystal light valves (LCLVs) associated with first, second and third colors of light, a polarization analyzer, positioned on said projection axis between said first, second, and third LCLVs and said projection lens, for transmitting light of a first polarization and for reflecting light of a second polarization, a reading light source for directing a reading beam of light onto said polarization analyzer, and a writing light source for directing a writing light to said first, second, and third LCLV, an improved LCLV color projection system comprising:

first and second dichroic mirrors immersed in air and positioned on said projection axis for separating light from said polarization analyzer into said first, second and third colors of light, said first dichroic mirror reflecting said first color of light to said first LCLV and transmitting said second and third colors of light, wherein said first and second dichroic mirrors combine light reflected from said first, second and third LCLV into a combined light beam and direct said combined light beam to said polarization analyzer; and compensation means located between said first dichroic mirror and said first LCLV for partially equalizing differing path lengths for said first, second and third colors of light introduced by transmission through said first and second dichroic mirrors to reduce astigmatism.

26. The LCLV color projection system of claim 25 wherein said second dichroic mirror separates light from said polarization analyzer into said second and third colors of light, said second dichroic mirror reflecting said second color of light to said second LCLV and transmitting said third color of light.

* * * * *